Aug. 17, 1971     W. D. WILLIAMS     3,600,264
STRUCTURAL LAMINATE
Filed Oct. 1, 1969
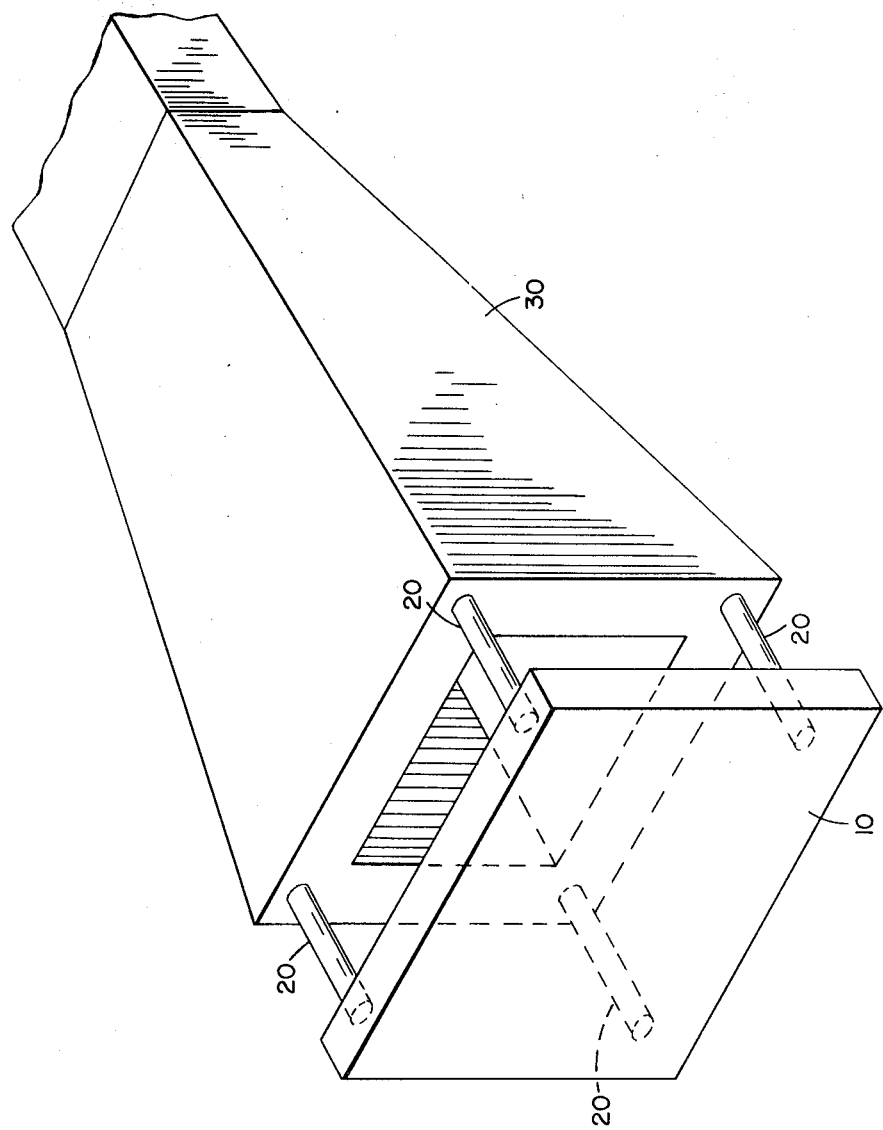
Warren D. Williams
*INVENTOR*
BY Harry M. Saragovitz
Edward J. Kelly
Herbert Berl
James T. Deaton

3,600,264
STRUCTURAL LAMINATE
Warren D. Williams, Dallas, Tex., assignor to the United States of America as represented by the Secretary of the Army
Filed Oct. 1, 1969, Ser. No. 862,732
Int. Cl. B32b *17/02, 17/10*
U.S. Cl. 161—140      2 Claims

ABSTRACT OF THE DISCLOSURE

A structural laminate for use in radomes and feed horn antennas. The laminate is made up of a plurality of fiber glass mats that are bonded together with a resin mixture that has dielectric material dispersed therein to produce a structure with a desired dielectric constant and loss tangent.

BACKGROUND OF THE INVENTION

This invention is in the field of structural laminate, and specifically, structural laminate of dielectric material such as inserts used in large radome structures and impregnated fiber glass windows used in antenna feed horns or scanners. In prior structural laminates, there was always a compromise between the electrical and physical properties of the laminate. Teflon and polyethylene laminates had bonding and stability problems, while Tellite and Rexolite lacked physical strength. Ceramics were heavy, expensive, and extremely brittle. Reinforced laminates were the most versatile structurally, but were limited electrically due to the fixed properties of the resins and glass fabric used in their construction.

A problem existed when a large, thin radome section say of 40 feet width by ⅛ inch thickness, was required that was light in weight, low in cost, and had the same electrical properties as a pure alumina ceramic, Even though it has desirable dielectric constant, loss tangent, and excellent high temperature characteristics, alumina has the undesirable features of being heavy, expensive, extremely brittle and unable to be fabricated in large sheets as thin as ⅛ inch. Therefore, a structural laminate is needed which is light in weight, low in cost and can have various dielectric constants and loss tangents.

SUMMARY OF THE INVENTION

In accordance with this invention, a laminate structure is provided in which fiber glass mats are bonded together with a resin mixture. The resin mixture has dielectric material dispersed therein before being used to bond the glass mats together. Therefore, in accordance with the amount of dielectric mixed therein a laminate can be produced that has the desired dielectric constant and loss tangent.

BRIEF DESCRIPTION OF THE DRAWING

The single figure is a diagrammatic view of a test set up of the structural laminate used with a horn antenna.

DESCRIPTION OF THE PREFERRED EMBODIMENT

Refer now to the single figure which shows an environment in which the inventive structural laminate is used. Numeral 10 designates the structural laminate that is attached to horn antenna module 30. Stand off insulators 20, made of dielectric material such as fiber glass tubing, positions structural laminate 10 away from horn antenna module 30 at a minimum standing wave ratio so that the horn transmits maximum energy.

An example of a specific structural laminate is as follows. 25 parts by weight styrene are mixed with 75 parts by weight polyester resin to provide a resin mixture with reduced viscosity. The resin mixture is catalyzed with a one percent benzoyl peroxide solution and is mixed with a dielectric material to produce a resin-dielectric mixture. The styrenated resin, comprising the styrene and styrenated polyester resin, is made in accordance with the procedure set forth in U.S. Pat. No. 2,779,701. The styrenated polyester resin comprises a mixture of chlorendic acid, fumaric acid, ethylene glycol and diethylene glycol. The dielectric is added to the resin in a weight mixture of 62 parts dielectric to 38 parts styrenated resin. The dielectric may be Du Pont titanium dioxide R-100, which is a minimum of 97 percent titanium dioxide in a rutile structure. The fiber glass mats are then placed in separate 4 foot by 8-foot mold plates and the resin-dielectric mixture is poured over the mats until each mat is thoroughly soaked. The fiber glass mats are treated with a polyester emulsion (silane coupling agent) bonding resin making the mats useful as a surfacing mat for polyester electrical grade laminates. Mats found to be acceptable are Owens Corning surfacing mat M514–236, 0.01 inch thick, which are non-woven and made from fiber glass strands. Each mat is thin, highly porous, bonded, and is made from monofilaments of type C glass, 0.0006 inch to 0.00065 inch nominal diameter, arranged in a veil-like pattern. The four mats that are soaked in the styrenated resin-dielectric mixture are stacked together in the platen press. A 50-pound per square inch pressure is applied at 230° Fahrenheit for 30 minutes for bonding the soaked mats together. The structural laminate made by this method is 0.06 inch thick and has a dielectric constant of 9.6 and a loss tangent of 0.0069. The amount of dielectric can be varied in the resin-dielectric mixture to obtain the desired dielectric constant and loss tangent for the laminate. Also, a low absorption pigment may be used for reducing the viscosity of the resin-dielectric mixture to cause better flow of the mixture and better absorption in the fiber glass mats.

I claim:

1. A structural laminate comprising: a plurality of glass mats made of nonwoven fiber glass strands, each of said glass mats being 0.01 inch thick and highly porous bonded mats made of type C glass monofilament of 0.0006 inch to 0.0005 inch diameter and arranged in a veil-like pattern; a resin mixture, said resin mixture substantially containing 25 percent styrene and 75 percent styrenated polyester resin by weight, with said styrenated polyester resin substantially containing chlorendic acid, fumaric acid, ethylene glycol and diethylene glycol, said resin mixture being catalyzed by one percent benzoyl peroxide; a dielectric, said dielectric being titanium dioxide in a rutile structure; and a resin-dielectric mixture formed by dispersing said dielectric in said resin mixture, said resin mixture and dielectric being present in said resin-dielectric mixture in the ratio of 38 parts by weight resin mixture to 62 parts by weight dielectric, said plurality of glass mats bonded together with said resin-dielectric mixture providing a structural laminate that has a predetermined dielectric constant and loss tangent.

2. A structural laminate as set forth in claim 1 wherein said plurality of glass mats is four and said structural laminate produced is 0.06 inch thick and has a dielectric constant of 9.6 and a loss tangent of 0.0069.

References Cited
UNITED STATES PATENTS

| | | | |
|---|---|---|---|
| 2,424,853 | 7/1947 | Safford | 252—63.5 |
| 2,779,701 | 1/1957 | Robitschek et al. | 161—204 |
| 3,287,311 | 11/1966 | Edwards | 252—63.5 |

ROBERT F. BURNETT, Primary Examiner

J. J. BELL, Assistant Examiner

U.S. Cl. X.R.

161—140, 156, 204; 174—68.5; 252—63.5